United States Patent [19]

Cozens

[11] Patent Number: 4,775,698

[45] Date of Patent: Oct. 4, 1988

[54] PROCESS FOR PRODUCING POROUS SUBSTANTIALLY SKINLESS PARTICLES OF CROSSLINKED PVC RESIN

[75] Inventor: Ross J. Cozens, North Ridgeville, Ohio

[73] Assignee: The B. F. Goodrich Company, Akron, Ohio

[21] Appl. No.: 169,795

[22] Filed: Mar. 18, 1988

Related U.S. Application Data

[62] Division of Ser. No. 38,087, Apr. 14, 1987, Pat. No. 4,742,085.

[51] Int. Cl.$^4$ ............................................. C08J 9/28
[52] U.S. Cl. .................................... 521/56; 521/145; 526/202; 526/214; 526/344; 526/344.2; 526/344.3; 526/345
[58] Field of Search ................. 521/56, 145; 526/202, 526/214, 344, 344.2, 344.3, 345

[56] References Cited

U.S. PATENT DOCUMENTS

| | | | |
|---|---|---|---|
| 3,522,227 | 7/1970 | Thomas | 260/92.8 |
| 3,706,722 | 12/1972 | Nelson et al. | 521/145 |
| 3,796,776 | 3/1974 | Ide et al. | 260/899 |
| 4,229,547 | 10/1980 | Cohen et al. | 521/145 |
| 4,340,530 | 7/1982 | Higashiguchi et al. | 524/515 |
| 4,435,524 | 3/1984 | Dinbergs | 521/56 |
| 4,458,057 | 7/1984 | Basu | 521/56 |
| 4,458,060 | 7/1984 | Yamane et al. | 526/292.3 |
| 4,567,217 | 1/1986 | Yamazaki et al. | 524/525 |
| 4,603,151 | 7/1986 | Dinbergs | 521/145 |

*Primary Examiner*—Morton Foelak
*Attorney, Agent, or Firm*—Joe A. Powell

[57] ABSTRACT

Porous particles of crosslinked PVC are disclosed. The particles are skinless and have a fast powder mix time. Processes to produce the novel particles are also disclosed.

7 Claims, 1 Drawing Sheet

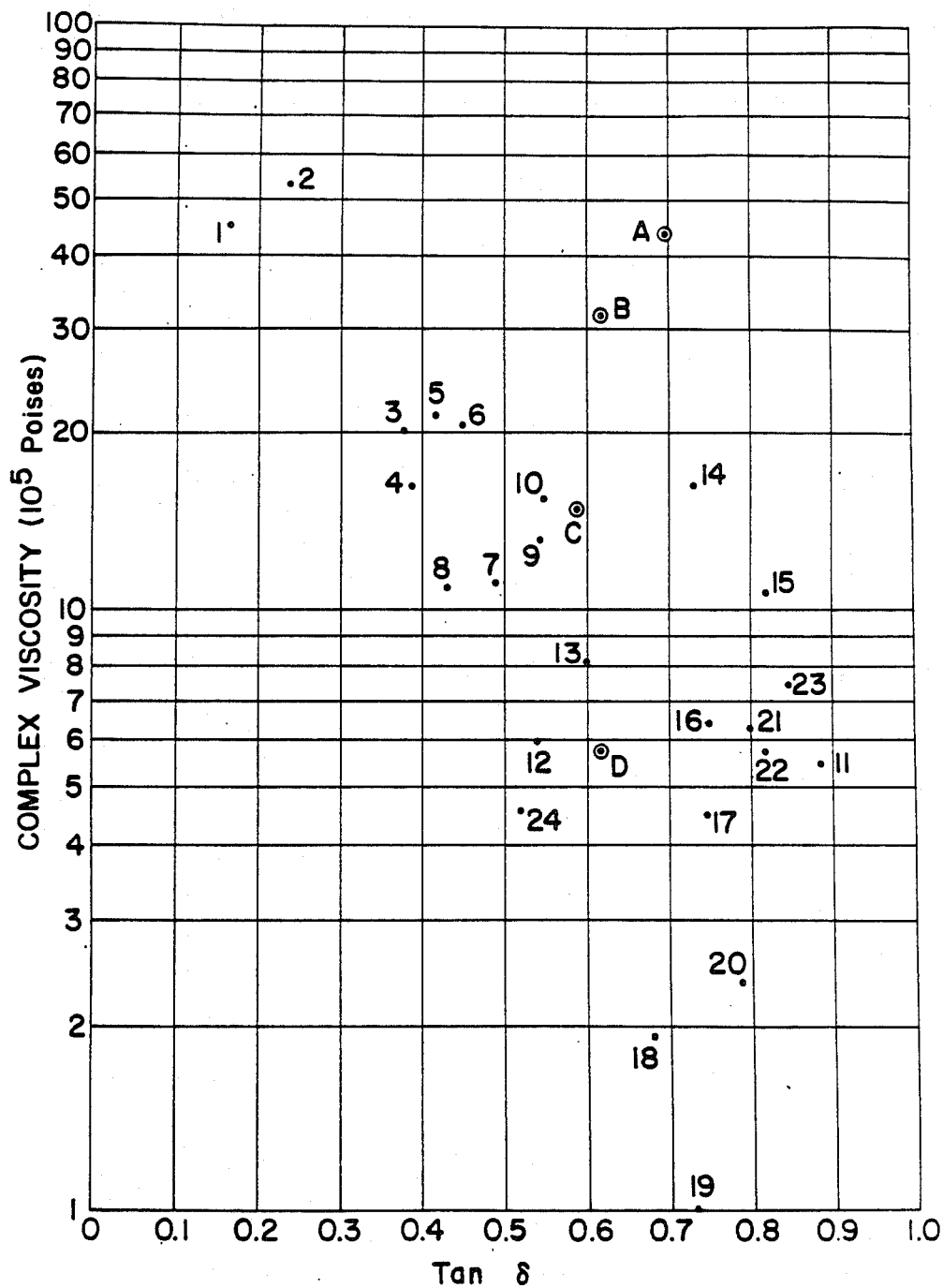

PROCESS FOR PRODUCING POROUS SUBSTANTIALLY SKINLESS PARTICLES OF CROSSLINKED PVC RESIN

This is a division of application Ser. No. 038,087, filed Apr. 14, 1987, now U.S. Pat. No. 4,742,085.

BACKGROUND OF THE INVENTION

Polyvinyl chloride resins when calendered or extruded give products which are very smooth and thus have a glossy finish. For many end uses this glossy finish is desirable, such as packaging films and clear containers. When a rough or dull finish, which is often referred to as a matte finish, is required, it has been suggested that crosslinking the PVC resin would give such a surface. Some end users find the matte finish desirable for their products. Crosslinking the PVC resin makes the resin more rubbery thus resulting in the resin being capable of giving a matte finish. Crosslinked resins can also offer advantages in other properties such as wear resistance.

Many applications where crosslinked resins would be desirable require that the resin be mixed with large amounts of plasticizers. PVC resins normally have porosity which allows the resins to absorb plasticizers. Crosslinking a resin detrimentally effects the ability of a resin to absorb plasticizer quickly. Although the crosslinked resins have porosity, the plasticizer does not incorporate as quickly as it does in a non-crosslinked resin having the same amount of porosity. This creates a problem in that an extra amount of time is required to incorporate the plasticizer. This time is normally referred to as "powder mix time".

It would be desirable to have a crosslinked PVC resin which would quickly absorb plasticizers thereby having a fast powder mix time.

SUMMARY OF THE INVENTION

It is an object of this invention to provide crosslinked PVC resin in particulate form which are skinless.

It is a further object of this invention to provide crosslinked PVC resins which have short powder mix times.

It is another object of this invention to provide crosslinked PVC resin in particulate form which are non-spherical, highly porous, friable and which are skinless.

It is a still further object of this invention to provide processes for producing the crosslinked resins.

These and other objects will become apparent from the following description of the invention.

A crosslinked PVC resin in particulate form characterized by more than 90% by weight of said resin particles having the following features:

(a) said particles are skinless as evidenced by an absence of a substantially continuous pericellular membrane;

(b) a complex viscosity of from about $0.9 \times 10^5$ poise to about $1000.0 \times 10^5$ poise, preferably about $1.0 \times 10^5$ to about $100.0 \times 10^5$, more preferably about $4.0 \times 10^5$ to about $60.0 \times 10^5$; and (c) a tan δ less tan 1.0, preferably from about 0.1 to about 0.95, more preferably from about 0.3 to about 0.7.

It is also preferred that more than 90% of said resin particles have the following features:

(a) a mercury porosity of from about 0.1 cc/g to about 0.8 cc/g, preferably from about 0.3 cc/g to about 0.5 cc/g;

(b) an agglomerated non-spherical shape having a shape factor less than about 0.85, preferably less than about 0.83, more preferably less than about 0.80;

(c) a weight average particle size of from about 70 microns to about 1000 microns, preferably from about 100 microns to about 250 microns;

(d) a friability less than about 2, preferably less than 1, more preferably 0;

(e) a powder mix time of less than about 400 seconds, preferably less than 300 seconds, more preferably less than 250 seconds;

(f) the surface area of said particles is greater than about 20% PVC, preferably greater than about 50%, more preferably greater than about 60% as measured by ESCA.

A process is provided for producing the preferred novel particles of this invention comprising polymerizing vinyl chloride monomer in the presence of a crosslinking agent in an agitated aqueous suspension wherein said aqueous medium contains as the primary dispersant small amounts of at least one ionic sensitive dispersant capable of thickening water and at least one secondary dispersant, wherein an ionic material is charged to the polymerization medium at from about 1% to 5% conversion of monomer to polymer and the ionic material desorbs a substantial amount of the ionic sensitive primary dispersant off the monomer droplet, thereby producing a crosslinked skinless, agglomerated, highly porous, friable, PVC resin absent a continuous pericellular membrane.

Alternate processes are also provided for producing the skinless crosslinked PVC particles of this invention.

The resins of this invention, even though highly crosslinked, unexpectedly have short powder mix times and are able to incorporate large amounts of plasticizer quickly.

BRIEF DESCRIPTION OF THE DRAWING

The FIGURE is a semi-log graph showing the range of skinless, crosslinked resins made in Example II (Runs 1–24) and the commercially available skin type crosslinked resins of Example III (A–D). Complex viscosity is plotted on the Y-axis as $10^5$ poises. The Y-axis is a log scale. The X-axis is tan δ. The numbers indicate the run number of Example II whereas the letters A–D indicate the corresponding resin of Example III.

DETAILED DESCRIPTION

Polyvinyl chloride resin as used in this invention means polyvinyl chloride homopolymers as well as vinyl chloride polymerized with up to 50%, preferably up to 20%, by weight of one or more other vinylidene monomers having at least one terminal $CH_2=C<$ grouping. Suitable comonomers that may be polymerized with vinyl chloride are esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art. The amount of comonomer that can be polymerized with vinyl chloride is a function of the choice of comonomer, as is well understood by those skilled in the art. Preferably, the polyvinyl chloride polymers of this invention are polyvinyl chloride homopolymers. The term polyvinyl chloride homopolymer as used in this specification includes the polymerized vinyl chloride as well as the small amount of crosslinking agents. Technically, the crosslinked resins of this invention will always be copolymers, because the crosslinking agent copolymerizes with the vinyl chloride. However, the amount of crosslinking agent is so small that in this specification this resin having only vinyl chloride and crosslinking agent as monomers will be referred to as a homopolymer. The invention will be described in terms of a polyvinyl chloride homopolymer as the preferred embodiment of this invention.

The skinless crosslinked resin particles of this invention may be produced by any one of many processes such as an agitated aqueous suspension process, which is the preferred process. They may also be produced by a mass or bulk polymerization process, where polymerization occurs in the substantial absence of water and surfactants. A mass process is described in U.S. Pat. No. 3,522,227, incorporated herein by reference. The mass process produces PVC which is skinless, since there are no surfactants present.

In the mass process, vinyl chloride is polymerized in mass (in the absence of additives except a useful quantity of catalyst) using a two step process in the first of which agitation of high turbulence is used and in the second very mild agitation, usually related only to the maintenance of uniform temperature in the reaction mass. In the first, high speed step the polymerization is carried to 7 to 15 percent completion, preferably about 10 percent. The vessel contents are then transferred to the second vessel for completion of the polymerization to the desired degree of conversion. The first stage is normally referred to as a prepolymerizer. The crosslinking agent would be added in the prepolymerizer vessel. Of course one vessel could be used for the mass polymerization, but two vessels are preferred.

A phase inversion process may also be used to produce the crosslinked skinless resins of this invention. Such a phase inversion process is disclosed in U.S. Pat. No. 3,706,722, incorporated herein by reference. In the phase inversion process, the monomer is the continuous phase during the early part of the polymerization and after about 10% conversion additional water is added such as to make the water the continuous phase and the monomer the discontinuous phase. This process in essence runs a mass type polymerization up to about 10% conversion and then inverts to a suspension type polymerization. The invention will be described in terms of the preferred aqueous suspension process.

The preferred process used to produce the peferred novel resin particles of this invention is an agitated aqueous suspension process. In the process, water is the polymerization medium and a vinyl monomer to water ratio in the range of about 1.0:1.0 to 1.0:10.0 is satisfactory. Preferably, a ratio in the range of about 1.0:1.0 to 1.0:4.0 is employed.

An important feature of the process to prepare the preferred resin particles of this invention is the dispersant system that is employed in the polymerization reaction for the purpose of stabilizing the dispersed monomer droplets. A colloidal unstable system will result in what is known as a solid charge, that is, the monomer droplets will agglomerate into large chunks which are unsuitable for use in normal PVC applications. A dispersant system which will not allow any agglomeration of monomer droplets will result in spherical particles. Such a process to produce spherical particles is described in U.S. Pat. No. 4,603,151. To obtain the preferred agglomerated skinless particle of this invention requires a delicate balance of having a few of the monomer droplets agglomerate but not excessive agglomeration such as to result in excessively large particles. An important component of this process is an ion sensitive dispersant which will thicken water. Examples of such thickeners and how they are used are disclosed in U.S. Pat. No. 3,620,988, incorporated herein by reference. The ion sensitive dispersants which will thicken water are usually high molecular weight dispersants or crosslinked dispersants which will thicken water at concentrations of less than 2% in water, preferably less than 0.2%, and more preferably less than 0.1% concentration in water. Suitable ion sensitive thickening dispersants include crosslinked polyacrylic acid polymers, crosslinked ethylene malic anhydride polymers, high molecular weight uncrosslinked polyacrylic acid polymers and ethylene malic anhydride polymers, and the like. The invention will be explained in connection with a substantially unneutralized crosslinked interpolymer.

A suitable ion sensitive thickener is a substantially unneutralized crosslinked interpolymer of one or more carboxylic acid monomers with a polyunsaturated compound having a plurality of terminally unsaturated polymerizable groups, for example, a crosslinked polyacrylic acid polymer. The crosslinking is responsible for making the polyacrylic acid polymer incapable of forming a true solution in water. In this regard, these polyacrylic acid polymers are classified as being substantially insoluble in water. Nevertheless, the structure of the interpolymer must be such that it has enough affinity for water to swell appreciably in an aqueous medium, thus thickening the water phase, but not to the extent that it cannot be agitated rapidly. Interpolymers that have little or no affinity for water and do not swell to any measurable degree, are not suitable for the purposes of the present invention.

With respect to the crosslinked polymeric dispersants used in making the resin of the invention, the carboxylic acid monomers utilizable in preparing the same are those which contain at least one active carbon-to-carbon double bond in the $\alpha,\beta$-position with respect to a carboxyl group such as

(1)

wherein R' is hydrogen or a —COOH group, and each of R" and R''' is a hydrogen or a monovalent substituent group which is linked to one of the doubly bonded carbon atoms. Carboxylic acids within this definition include acids, such as acrylic acid, wherein the double bond is terminal such as

(2)

or the dicarboxylic acids such as maleic acid and other anhydrides of the general structure

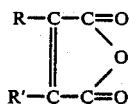 (3)

wherein R and R' are monovalent substituent groups and especially those selected from the group consisting of hydrogen and halogen groups and alkyl, aryl, alkaryl, aralkyl, and cycloaliphatic radicals.

Included within the class of carboxylic acids, shown by generic formula (1) above, are widely divergent materials, such as the acrylic acids, such as acrylic acid itself, methacrylic acid, ethacrylic acid, α- and β-chloro and bromo-acrylic acids, crotonic acid, maleic acid, itaconic acid, and many others.

Polymerizable carboxylic anhydrides include any of the anhydrides of the above acids, including mixed anhydrides, and those shown by generic formula (3) above, including maleic anhydride, and others. In many cases, it is preferred to copolymerize an anhydride monomer with a comonomer, such as methyl vinyl ether, styrene, ethylene, and the like.

It is preferred to employ polymeric dispersants which are derived from polymers produced by the polymerization of the α,β-monoolefinically unsaturated carboxylic acids. The preferred carboxylic acids are those derived from the acrylic acids and α-substituted acrylic acids having the general formula

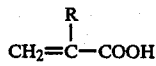

wherein R is a monovalent substituent selected from the group consisting of hydrogen, halogen, hydroxyl, carboxyl, amide, ester, lactone, and lactam.

The most preferred polymeric dispersants are those prepared from the lightly crosslinked interpolymers of acrylic acid. These dispersants are the most effective.

The crosslinking agents which may be employed with any of the carboxylic monomers, or mixtures thereof, may be any compound, not necessarily monomeric in nature, containing two or more terminal polymerizable $CH_2=C<$ groups per molecule. Examples of this class of materials include polyunsaturated-hydrocarbons, -polyethers, -polyesters. -nitriles, -acids, -acid anhydrides, -ketones, -alcohols and polyunsaturated compounds of this class incorporating one or more of these and other functional groups. Specifically, there may be utilized divinyl benzene, divinyl naphthalene, low-molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl poly-ethers containing from two to seven or more of these or other alkenyl ether groupings per molecule and made from polyhydric alcohols, such as the carbohydrate sugars, and the so-called "sugar alcohols", including erythritol, pentaerythritol, arabitol, iditol, mannitol, sorbitol, inositol, raffinose, glucose, sucrose, and many others, and other polyhydroxy carbohydrate derivatives, the corresponding polyalkenyl silanes, such as the vinyl and allyl silanes, and others. Of this large class of crosslinking agents, the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the poly-hydroxy carbohydrate derivatives.

In the monomeric mixture, for making the crosslinked polymers employed as primary dispersants in the suspension polymerization process used in this invention, the two essential monomeric materials should be present in certain proportions, although the exact proportions will vary considerably depending on the characteristics desired in the polymer. Small amounts of the polyalkenyl polyether copolymerize quite readily with carboxylic monomers and the crosslinking effect of the polyalkenyl polyether on the carboxylic monomer is so strong that as little as 0.1% by weight thereof, based on the weight of the total mixture, produces a great reduction in the water and solvent-solubility of the resulting crosslinked polymer. When 0.1% to 4.0%, more preferably 0.20% to 2.5%, by weight of the polyether is utilized, water-insoluble polymers are obtained, especially with acrylic acids, which are extremely water sensitive. Useful dispersants are also obtained when 0.1% to 6.0%, and preferably 0.2% to 5%, of the polyether is copolymerized with maleic anhydride. In the dual copolymer, or two-compound interpolymer, this means that the remainder of the monomeric mixture will be the carboxylic monomer.

The monomeric proportions employed in the production of multi-component interpolymers may vary in a somewhat similar manner. However, it is generally desirable to utilize as much of the carboxylic monomer or monomers and as little of the other monomeric constituents as is consistent with the desired water-insolubility and other properties. In these interpolymers, therefore, the carboxylic monomer or monomers should never be less than 25%, and preferably not less than 40%, by weight of the total monomeric mixture. Multi-component interpolymers may be made from monomeric mixtures comprising from 25% to 95% of a carboxylic monomer, such as acrylic acid, 0.1% to 30% of a polyalkenyl polyether, such as a polyallyl polyether of sucrose, and 5.0% to 74.9% of an additional monomer or monomers. Preferred multi-component interpolymers are the tripolymers resulting from the polymerization of monomeric mixtures containing, respectively, from 40% to 95% by weight of acrylic acid, 0.20% to 2.5% by weight of polyallyl polyether, such as that of sucrose, and 4% to 59% of an additional monomer or monomers, such as maleic anhydride, N-methyl acrylamide, methyl vinyl ether, ethyl vinyl ether, n-butyl vinyl ether, and the like, and mixtures of maleic anhydride, a vinyl alkyl ether, such as vinyl methyl ether, and a polyallyl polyether, in which the sum of the moles of vinyl ether and polyallyl polyether is substantially equivalent to the molar quantity of maleic anhydride present. It should be borne in mind that in the above proportions, if a maximum amount of two of the monomers are utilized, that somewhat less than maximum amounts of the other monomers must be utilized.

Suitable for use as additional monomers in the production of multi-component interpolymers are monoolefinic vinylidene monomers containing one terminal $CH_2=C<$ group, such as styrene, the chloro and ethoxy-styrenes, etc., acrylamide, N-methyl-acrylamide, N,N-dimethyl acrylamide, acrylonitrile, methacrylonitrile, methyl acrylate, ethyl acrylate, 2-ethylhexylacrylate, methyl methacrylate, vinyl acetate, vinyl benzoate, vinyl pyridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl dialkenyl or other polyfunctional esters, amides, ethers, ketones, and the like, may be used in the production of multi-component interpolymers, especially those polyfunctional monomers which nominally function as crosslinking or insolubilizing monomers but which are easily saponified and hydrolyzed to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether crosslinks. The presence of strong alkali or acid speeds dissolution. Spectroscopic analysis confirms the presence in the polymers of non-carboxylic hydroxyls. Similarly, diesters, such as diallyl maleate, ethylene glycol dimethacrylate, acrylic anhydride, betaallyloxy acrylate, and many others, are readily saponified or hydrolyzed by alkali or acid with the introduction of additional hydroxyl and/or carboxyl groups. Of the additional monomers, N-methyl acrylamide, methyl vinyl ether, ethyl vinyl ether and divinyl ether have been found particularly useful in the production of the substantially unneutralized crosslinked interpolymers for use as ion sensitive dispersants in the suspension polymerization of vinyl monomers.

The amount of the water-insoluble substantially unneutralized crosslinked interpolymer useful as an ion sensitive dispersant, in the process of making the novel resins of this invention will vary in the range of about 0.01 parts by weight to about 0.1 parts by weight, based on 100 parts by weight of the monomer or monomers being polymerized. Preferably, the amount used will be in the range of about 0.02 parts by weight to about 0.06 parts by weight per 100 parts by weight of monomer or monomers being polymerized In the process to make the novel preferred resins of this invention, other secondary dispersants are preferably employed, along with the ion sensitive dispersant. Dispersants which tend to form a skin on the resin particles such as methyl cellulose and high hydrolysis (above 70%) polyvinyl acetate should be avoided. The secondary dispersants should be monomer soluble and not fully soluble in water. For PVA secondary dispersants, the higher the % hydrolysis, the more water soluble the dispersant. For example, 30% hydrolyzed PVA is monomer soluble and not water soluble, 55% hydrolyzed PVA is very soluble in the vinyl monomer but is also partially soluble in water. 72.5% hydrolyzed PVA is fully water soluble and therefore not acceptable. The fully water soluble dispersants will form a skin on the polymer particle. Oil-soluble non-polyethylene oxide containing secondary dispersants are suitable for use in this invention. Suitable non-polyethylene oxide containing secondary dispersants are those compounds from the sorbitan ester family or the glycerol ester or polyglycerol ester families, as well as the low hydrolysis (less than 70%, preferably less than 60%, and more preferably less than about 55%) polyvinyl acetates, which do not contain polyethylene oxide segments. As examples of such dispersants, there may be named sorbitan trioleate, sorbitan tri-stearate, sorbitan monooleate, sorbitan monopalmitate, glycerol monooleate, glycerol monostearate, triglycerol monooleate, 50% hydrolyzed polyvinyl acetate, and the like. A mixture of more than one of these dispersants may be used. The function of the secondary dispersants is to increase the porosity of the polymer particles and to increase the colloidal stability of the polymerization mixture. The non-polyethylene oxide containing dispersant is used at a level of from about 0.005 part by weight to about 1.0 part by weight per 100 parts by weight of monomer, preferably from about 0.1 part by weight to about 0.4 part by weight per 100 parts by weight of monomer. More than one secondary dispersant may be used in this invention to achieve the secondary dispersant level.

The polymerization is initiated with a free radical catalyst. The monomer-soluble or oil-soluble catalysts that may be used in the polymerization process of this invention are the alkanoyl, aroyl, alkaraoyl, and aralkanoyl diperoxides and monohydroperoxides, azo compounds, peroxy ester, percarbonates, and other free radical type catalysts. As examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azo-bis isobutyronitrile, $\alpha,\alpha'$-azodiisobutyrate, 2,2'-azobis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an amount of catalyst in the range of about 0.01 part by weight to about 0.20 part by weight based on 100 parts by weight of monomer(s).

The preferred suspension polymerization process of this invention may be carried out at any temperature which is normal for the monomeric material to be polymerized. Preferably, a temperature in the range of about 0° C. to about 100° C. is employed, more preferably from about 40° C. to about 80° C. In order to facilitate temperature control during the polymerization process, the reaction medium is kept in contact with cooling surfaces cooled by water, brine, evaporation, etc. This is accomplished by employing a jacketed polymerization reactor wherein the cooling materials are circulated through the jacket throughout the polymerization reaction. This cooling is necessary since most all of the polymerization reactions are exothermic in nature. It is understood, of course, that a heating medium can be circulated through the jacket, if necessary.

The preferred process to produce resins of this invention involves using an ionic material to desorb the primary dispersant off the resin. Suitable ionic materials are bases which will neutralize the polyacrylic acid primary dispersant and form a salt. Preferably, the ionic material is a monovalent inorganic or organic base such as amines, sodium hydroxide, ammonium hydroxide, potassium hydroxide, lithium hydroxide, and the like. The most preferred ionic material is sodium hydroxide. Divalent and trivalent materials can crosslink the polyacrylic acid primary dispersant and would therefore not normally be chosen as the ionic material. The preferred embodiment of this invention will be described in terms of using sodium hydroxide as the ionic material. The primary dispersant protects the monomer droplets at the very early stages of polymerization. Before the primary dispersant can graft polymerize with the vinyl chloride, NaOH is added to the polymerization medium. The ion sensitive primary dispersant will then swell in size and desorb off the droplet. Protection of the droplet is accomplished after this point by the increased size of the primary dispersant. The NaOH must be added early in the polymerization, usually from 0.5% to 5.0% conversion of monomer to polymer. If the NaOH is added at the beginning or before about 0.5% conversion, the primary dispersant will be desorbed off the droplet too early and could result in an unstable suspension. Preferably the NaOH is added at from 1% to 3% conversion, more preferably 1% to 2% conversion. Since the primary dispersant is desorbed from the droplet and polymerization is continued without a primary dispersant on the particle, the resulting resin is essentially skin-free. Of course, some primary dispersant can become attached to the resin particle without departing from this invention but there cannot be a continuous pericellular membrane present as there is in normal suspension PVC resin.

The amount of NaOH typically added is an amount sufficient to raise the pH about 0.5 to 1.0 point. Usually the amount of NaOH needed to desorb the primary dispersant is from about 0.0010 part by weight to about 0.0100 part by weight per 100 parts of monomer. More could be used but it would not serve a useful purpose.

If an ion sensitive dispersant is used which will thicken by lowering pH, then rather than adding NaOH to desorb the dispersant, HCl could be used. The HCl would work in the same fashion as described above and should be added at similar low conversion levels as described above.

An alternate process to produce the crosslinked skinless resins of this invention is to use extremely low levels of the ion sensitive primary dispersant. Levels of from about 0.01 to about 0.03 parts by weight per 100 parts by weight of polymerizable monomer should be used in this alternate method. If these low levels are used, then it is not necessary to use the NaOH to desorb the primary dispersant from the monomer droplet. Secondary dispersants at levels described above are used in this alternate method.

An additional alternate process to produce the resins of this invention involves the use of a combination of dispersants. The combination of dispersants are non-polyethylene oxide containing secondary dispersants such as sorbitan esters, for example sorbitan monooleate and non-polyethylene oxide containing dispersants such as low hydrolysis PVA, and primary dispersant polyacrylic acid. Sorbitan esters are effective porosifiers but in amounts greater than 0.1 part they tend to be highly destabilizing. It was also found that higher levels of about 0.2 to 0.4 part of sorbitan ester would prevent the formation of a skin by the primary dispersant. It was also found that low hydrolysis PVA (less than 70%, preferably less than 60%, more preferably less than about 55%) in amounts of from about 0.1 to 0.3 part by weight would counteract the destabilizing effect of sorbitan ester. The level of polyacrylic acid dispersant used in this additional alternate process to give skinless crosslinked resin will vary depending upon the level of PVA. For levels of PVA of about 0.3 part, the polyacrylic acid dispersant needs to be less than 0.04 part, whereas for levels of PVA of about 0.1, the level of polyacrylic acid dispersant can be higher, such as about 0.06. As the level of PVA increases, the level of polyacrylic acid dispersant must decrease to obtain a skinless resin. High hydrolysis PVA's greater than 70% and dispersants such as methyl cellulose should be avoided because they will form a skin on the resin.

Reactor Charging Procedure

In the preferred process to produce skinless resins of this invention, a charging procedure similar to the one disclosed in U.S. patent application Ser. No. 06/846,163 filed March 31, 1986, incorporated herein by reference, should be used. The procedure used is what is known as a one poly floating method. The free radical catalyst is first mixed with a solvent, such as isopropol alcohol, in the preferred process. This technique of using a catalyst solution and its added benefits are fully disclosed in the above incorporated patent application. The polymerization reactor charging procedure is explained in the steps below.

(a) Charge water and ion sensitive primary dispersant(s) capable of thickening water to the polymerization vessel. The primary dispersant(s) can be added as such but is preferably added as a concentrated mixture with water. The water and primary dispersant(s) may be premixed before charging to the polymerization vessel. The charge water is preferably demineralized water.

(b) Agitate the water and primary dispersant(s) until an emulsion is formed.

(c) Reduce or stop the agitation such that non-turbulent flow is achieved.

(d) Charge the monomer(s) and crosslinking agent to be polymerized to the reactor vessel such that said monomer floats on top of the emulsified thickened aqueous layer.

(e) Charge a solution comprising a solvent and the free radical catalyst and optionally the secondary dispersant(s) to the reactor. If the secondary dispersant(s) are not combined with the catalyst solution, then they should have been premixed with the monomer before adding to the reactor.

(f) Allow the catalyst solution to diffuse through the monomer layer.

(g) Increase the agitation such that the entire polymerization medium is emulsified.

(h) Conduct to polymerization until 1% to 2% conversion is reached, then add NaOH to desorb the primary dispersant from the monomer droplet.

(i) Continue the polymerization until the desired degree of polymerization is achieved.

An alternate charging method, known as the two poly method, is to first add the monomer(s) and crosslinking agent to the reactor together with the solution containing the catalyst and secondary dispersant(s). The catalyst solution could, of course, be premixed with the monomer prior to adding to the reactor vessel, in which case agitation would not be necessary after adding to the reactor. This mixture is then agitated thoroughly. The thickened water, which had been previously made up by mixing the ion sensitive thickening primary dispersant(s) with water, is charged into the bottom of the reactor through a bottom entry port. Agitation is then re-started and polymerization conducted as above.

The catalyst could also be charged neat into the water phase containing the primary dispersant. If this method were used, then the catalyst would not first be premixed with the solvent.

To produce the crosslinked skinless resins of this invention, a crosslinking agent is used. The preferred crosslinking agents are those materials which are soluble in the vinyl monomer and the vinyl polymer. The reactivity ratio of the crosslinking agent should be such that it prefers to add to the vinyl monomer rather than to add to itself. The rate constants (k) of the various reactions involved can be expressed as:

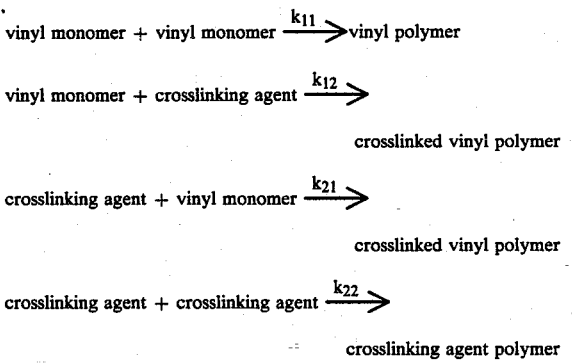

The monomer reactivity ratio of vinyl monomer ($R_1$) can be expressed as $$R_1 = k_{11}/k_{22}$$

The monomer reactivity ratio of the crosslinking agent ($R_2$) can be expressed as $$R_2 = k_{22}/k_{21}$$

Ideally the product of $R_1$ and $R_2$ would be equal to 1 ($R_1 \times R_2 = 1$).

The crosslinking agents should be completely reacted before the normal termination of the polymerization, so as not to have crosslinking monomer present as residual monomer in the vinyl polymer. Vinyl chloride polymerizations are normally run to a % conversion of monomer to polymer of from about 50% to 90%, preferably from about 65% to about 80%. The conversions can of course be higher or lower depending on the desired properties of the resin.

The crosslinking agents which are suitable to produce the novel resin of this invention include, for example, diallyl phthalates such as diallyl phthalate, diallyl isophthalate, diallyl terephthalate, etc.; diallyl esters of ethylenically unsaturated dibasic acid such as diallyl maleate, diallyl fumarate, diallyl itaconate, etc.; diallyl esters of saturated dibasic acid such as diallyl adipate, diallyl azelate, diallyl sebacate, etc.; divinyl ethers such as diallyl ether, triallylcyanulate, triallyl isocyanurate, triallyl trimellitate, ethylene glycol divinyl ether, n-butanediol divinyl ether, octadecan divinyl ether, etc.; di(meth)acryl esters of polyhydric alcohols such as ethylene glycol dimethacrylate, diethylene glycol dimethacrylate, diethylene glycol diacrylate, triethylene glycol methacrylate, etc.; tri(meth)acryl esters of polyhydric alcohols such as trimethylolpropane trimethacrylate, trimethylolethane trimethacrylate, trimethylolpropane triacrylate, trimethylolmethane triacrylate, tetramethylolmethane triacrylate, etc; polyfunctional compounds such as bismethacryloyloxyethylene phthalate, 1,3,5-triacryloylhexahydrotriazine, etc. A mixture of more than one crosslinking agent may be used. Diallyl phthalate is the most preferred crosslinker for making the resins of this invention.

The crosslinking agent may be added to the polymerization medium in any manner known to those skilled in the art; such as premixing with the vinyl monomer before charging, charging directly into the polymerization medium or metering into the reaction during the polymerization. The preferred method is to first premix the crosslinking agent with the vinyl monomer before charging to the reaction vessel. If a mass polymerization is used to produce the crosslinked skinless resins of this invention, then the crosslinking agent should be added in the prepolymerizer.

The amount of crosslinking agent used to make the resins of this invention is from about 0.05 part by weight to about 5.0 parts by weight, preferably about 0.15 part to about 1.0 part by weight, more preferably about 0.25 part to about 0.6 part by weight per 100 parts by weight of vinyl monomer.

The polymer particles produced by the present invention should have an average diameter by weight greater than about 70 microns. The particles could have an average diameter up to 1000 microns but normally, the polymer particles will have an average diameter by weight less than about 300 microns. Preferably, for most end uses, the polymer particles will have a diameter in the range of about 100 microns to about 250 microns, most preferably from about 125 microns to about 200 microns. Resins with an average particle size by weight less than 70 microns tend to be dusty and build up static easily such that they are less desirable.

The preferred resin particles of this invention are agglomerated non-spherical in shape. The preferred agitated aqueous suspension processes described above will give an agglomerated non-spherical resin particle. A mass process and the phase inversion process of U.S. Pat. No. 3,706,722 both give more spherical shaped resins than does the preferred agitated aqueous suspension process. A very good method to measure the spherical shape of resins is to determine the shape factor by optical procedures. The image of the particle is projected onto a flat surface to provide a two dimensional view. The shape factor of a particle is determined by inscribing and circumscribing the resin particles flat image with a circle. The ratio of the diameters of the inscribed circle to the circumscribed circle is the number known as the shape factor.

In the case of a perfect circle, the inscribed and circumscribed circles would have the same diameter and, therefore, the shape factor would be unity (1.0). The more near the shape factor is to 1.0 the more spherical the particle.

The shape factor of the resin particles made by the preferred agitated aqueous suspension process of this invention is less than about 0.85, preferably less than about 0.83, and more preferably less than about 0.80. The shape factor of resin particles made by the mass process and the phase inversion process are from about 0.87 to about 0.91.

The preferred resin particles made by this invention also have high porosity of from about 0.10 cc/g to about 0.8 cc/g as measured using mercury porosimeter. Preferably, the mercury porosity is from about 0.30 cc/g to about 0.50 cc/g. Porosity is measured according to ASTM D-2873 procedure. Sometimes porosity is measured as DOP porosity, which gives results about 0.02 cc/g higher than mercury porosity values reported herein for the same resin. When using a mass process, low conversions of from 35% to 65%, preferably 40% to 50% of monomer to polymer, are used to achieve high porosity.

The resins of this invention must be skinless. The term skinless as used in this specification means that the resin does not have a continuous pericellular membrane as does a typical PVC resin. There may be discontinuous areas or spots of skin on the resin surface but the resin would still be considered skinless under the meaning used in this invention. The term skinless as used herein includes what is normally referred to as low-skin.

One method to characterize skinless resins is to determine the composition of the surface of the resin particle by use of XPS (ESCA) technique. If a resin was totally skinless, there would not be any primary dispersant on the surface. The surface of the resins of this invention will have less than 40%, preferably less than 25%, and more preferably less than 10%, of the primary dispersant, as measured by ESCA technique. The surface will consist mainly of PVC and secondary surfactants (porosifiers).

The resin particles of this invention have a surface composition as measured by ESCA greater than about 20% PVC, preferably greater than about 50%, more preferably greater than about 60%. This indicates that the particles have a significant portion of holes in their skin, where said holes allow the plasticizer to easily pass into and be absorbed by the particle. ESCA is an acronym that stands for electron spectroscopy for chemical analysis. The ESCA technique involves irradiating the sample with X-rays from an X-ray tube. The X-rays knock electrons out of the atoms that are on the surface of the sample. The energy and number of these electrons are measured. From that information one can determine what elements are present. The depth of analysis of ESCA is about 20 to 30 angstroms which is about 5 or 6 monolayers of atoms on the surface of a sample. One should keep in mind that the ESCA test conducts an analysis of the surface visible to the ESCA. In a skinless or low skin resin, pores are open to the surface, therefore the X-rays are going into the pores and the results reflect an analysis of the bottom of the pore as well as the outermost surface of the resin particle. This explains to a great deal why the ESCA analysis of a skinless resin shows the secondary dispersant present. The secondary dispersant is believed to be present on the primary particles which are visible when looking into the pores.

Another method to determine if a resin is skinless is to look at the resin under magnification or take microphotographs of resin particles and observe if a continuous skin or pericellular membrane exists. In a microphotograph, an observer can see into the internal area of the resin particles of this invention. The high porosity, friable particles appear like a sponge with many openings in the surface of the resin particle. These openings allow for fast plasticizer uptake and create a friable particle which is easily broken down into smaller units (primary particles).

The resin particles of this invention also have a fast powder mix time as measured using a torque rheometer according to ASTM D-6373. The resin particles of this invention have a powder mix time of less than about 400 seconds, preferably less than 300 seconds, more preferably less than 250 seconds.

The preferred resins of this invention also have good friability. The friability value of a resin is an indication of the relative ease with which grains break down into agglomerates and finally to primary particles. The lower a resin's friability value, the more desirable the resin. High friability values are known to relate to temporary fish-eyes and surface roughness in flexible extrudates. Fish eyes are undesirable areas in a product, such as a film, which are areas of non-uniformity. This is especially important in powder extrusion and high plasticizer applications. One method to test PVC resin for friability is to place a given amount of resin in a mortar and grind the resin with a pestle. The better the friability, the easier the resin particles will break apart. The friability is then subjectively graded on a scale of from 0 to 5, with 0 being very friable and equivalent to the best known PVC for friability. A level of 5 is equivalent to a high quality general purpose grade resin. Values between 0 and 5 are rated as to how they compare with reference standards which are blends of a 0 value resin and a 5 value resin. The resins of this invention have a friability value of about 2 or less, preferably they have a friability value of 1 or less, and more preferably they have a friability value of 0.

For reference, make up standards using blends of Geon ® 92 (a skinless spherical PVC resin produced by B. F. Goodrich according to the process of U.S. Pat. No. 3,706,722) and well known for its excellent friability and Geon ® 30 (a high quality general purpose grade PVC resin with a skin produced and sold by B. F. Goodrich) as follows:

Reference Standard "0" is a mix of Geon 92: 100 parts and Geon 30: 0 parts.

Reference Standard "1" is a mix of Geon 92: 80 parts and Geon 30: 20 parts.

Reference Standard "2" is a mix of Geon 92: 60 parts and Geon 30: 40 parts.

Reference Standard "3" is a mix of Geon 92: 40 parts and Geon 30: 60 parts.

Reference Standard "4" is a mix of Geon 92: 20 parts and Geon 30: 80 parts.

Ref2erence Standard "5" is a mix of Geon 92: 0 parts and Geon 30: 100 parts.

Compare the friability of the resin tested to the friability of the reference standards. Choose the standard which most closely corresponds to the test resin and report that standard as the friability of the test resin.

The behavior of a PVC resin during compounding (and that of the resulting compound during processing) is controlled by such properties as resin particle size, porosity and temperature-shear rate dependent rheology. The rheology or flow behavior of PVC is significantly influenced by resin molecular weight, crystallinity, composition and branch structures that might be present. The best method of characterizing these molecular properties, especially when branch structures are present, is to analyze the viscoelastic properties of the resin. The crosslinked resins of this invention may be characterized by their viscoelastic properties.

The method used for determining viscoelastic properties of the resins of this invention involves subjecting a disk-shape sample to very small deformation (less than 1% strain) in a cyclic fashion using a Rheometrics Mechanical Spectrometer equipped with oscillating parallel plates. During deformation of the sample, a certain amount of energy is lost due to molecular segmental motions. The remaining energy is stored by elastic mechanisms. These two types of behavior are simultaneously measured during testing and are reflected in the magnitudes of the loss modulus (G") and storage or elastic moldulus (G'). Also measured is the complex viscosity (n*), which is analogous to the steady state shear viscosity as might be measured by a capillary rheometer.

Complex viscosity is an indication of molecular weight. Intrinsic viscosity (IV) is normally the method of expressing molecular weight of a PVC resin. However, with crosslinked resins the resin is not completely soluble, thus the IV cannot be accurately determined. Therefore molecular weight of the resins of this invention are expressed as complex viscosity, with the units being poise. The complex viscosity is measured at 210° C. The resins of this invention have a complex viscosity of from about $0.9 \times 10^5$ poise to about $1000.0 \times 10^5$ poise, preferably about $1.0 \times 10^5$ to about $100.0 \times 10^5$, more preferably about $4.0 \times 10^5$ to about $60.0 \times 10^5$. In terms of behavior, a complex viscosity of $0.9 \times 10^5$ poise corresponds to an IV of from about 0.8, and a complex viscosity of $60.0 \times 10^5$ poise corresponds to an IV of about 1.5.

Another important viscoelastic property of the resins of this invention is the tan , which is the ratio of the loss modulus (G") to the energy storage modulus (G'). The tan δ can be expressed by the formula:

Tan $\delta = G''/G'$

Tan δ is an indication of the amount of long chain branching (crosslinking) present in the resin. A PVC homopolymer with no crosslinking would have a tan δ of about 1.0. As crosslinking occurs, the tan δ gets smaller. The tan δ of the crosslinked resins of this invention are less than 1.0, preferably from about 0.1 to about 0.95, more preferably from about 0.3 to about 0.7. The tan δ is measured at 210° C.

To further illustrate the present invention, the following specific examples are given, it being understood that this is merely intended in an illustrative and not a limitative sense. In the examples, all parts and percents are by weight unless otherwise indicated.

EXAMPLE I

This Example is presented to demonstrate a process to produce the crosslinked skinless resin of this invention. An 1100 gallon reactor equipped with agitation and cooling means was used in this Example. The following polymerization recipe was used:

| Ingredient | Parts by Wt. |
|---|---|
| Vinyl Chloride | 100 |
| Water (demineralized) | 150 |
| Diallyl phthalate | 0.260 |
| Polyacrylic Acid Dispersant | 0.025 |
| NaOH | 0.0025 |
| Isopropyl Alcohol | 0.120 |
| Low Hydrolysis (55%) PVA | 0.300 |
| 2-ethyl Hexyl Peroxydicarbonate | 0.045 |
| Phenolic Shortstop | 0.020 |

The ingredients were charged according to the two poly method disclosed in this specification. The reaction was conducted at 53° C. The NaOH was charged as a solution in water after 15 minutes into the reaction (about 1% conversion). At 275 minutes the reaction was terminated with the phenolic shortstop. The resin was removed from the reactor, stripped of residual monomer and dried to a free flowing powder.

The resin particles were agglomerated, irregular shaped, porous, crosslinked skinless resin particles with the following properties:

| | |
|---|---|
| Weight average particle size | 160 microns |
| Mercury porosity | 0.407 cc/gm |
| Powder mix time | 216 seconds |
| Complex viscosity | $20 \times 10^5$ poise |
| Tan δ | 0.5 |

This example demonstrates a crosslinked skinless resin having a fast powder mix time, and high porosity. The tan δ indicates a significant amount of crosslinking. This resin when calendered or extruded will give a matte finish.

EXAMPLE II

This Example is presented to show a broad variety of crosslinked skinless PVC resins with different amounts of crosslinking. The same polymerization recipe and charging procedure was used as in Example I except the amount of crosslinking agent (diallyl phthalate) and polymerization temperature. The part level of crosslinking agent is parts per 100 parts vinyl chloride monomer. The following results were obtained:

TABLE I

| Run No. | Reaction Temp. °C. | Crosslink Agent Part Level | Complex Visc. $\times 10^5$ poise | Tan δ | cc/g Hg Porosity | Powder Mix Time-Sec. | Wt. Avg. Particle Size-Micron |
|---|---|---|---|---|---|---|---|
| 1 | 55 | 2.0 | 45.00 | 0.17 | 0.71 | 159 | 236 |
| 2 | 40 | 0.60 | 53.00 | 0.24 | 0.35 | 363 | 136 |
| 3 | 53 | 0.60 | 20.00 | 0.38 | 0.75 | — | 191 |
| 4 | 60 | 0.75 | 16.00 | 0.39 | 0.44 | 181 | 218 |
| 5 | 53 | 0.45 | 20.70 | 0.42 | 0.42 | — | 150 |
| 6 | 53 | 0.45 | 20.20 | 0.45 | 0.38 | — | 235 |
| 7 | 60 | 0.50 | 11.00 | 0.49 | 0.45 | 227 | 150 |
| 8 | 65 | 0.75 | 10.90 | 0.43 | 0.38 | 215 | 163 |
| 9 | 53 | 0.32 | 13.00 | 0.54 | 0.41 | — | 145 |
| 10 | 55 | 0.40 | 15.30 | 0.55 | 0.31 | — | 226 |
| 11 | 60 | 0.25 | 5.40 | 0.88 | 0.41 | 227 | 144 |

TABLE I-continued

| Run No. | Reaction Temp. °C. | Crosslink Agent Part Level | Complex Visc. × $10^5$ poise | Tan δ | cc/g Hg Porosity | Powder Mix Time-Sec. | Wt. Avg. Particle Size-Micron |
|---|---|---|---|---|---|---|---|
| 12 | 70.5 | 0.76 | 5.90 | 0.54 | 0.31 | 259 | 149 |
| 13 | 65 | 0.50 | 8.05 | 0.60 | 0.36 | 295 | 182 |
| 14 | 50 | 0.15 | 16.00 | 0.73 | 0.41 | — | 235 |
| 15 | 53 | 0.15 | 10.60 | 0.82 | 0.39 | — | 150 |
| 16 | 64 | 0.40 | 6.30 | 0.75 | 0.32 | 240 | 185 |
| 17 | 64 | 0.30 | 4.45 | 0.75 | 0.31 | 228 | 169 |
| 18 | 70 | 0.50 | 1.90 | 0.68 | 0.78 | — | 453 |
| 19 | 70 | 0.25 | 0.92 | 0.73 | 0.46 | 136 | 218 |
| 20 | 65 | 0.25 | 2.38 | 0.79 | — | — | — |
| 21 | 58 | 0.20 | 6.20 | 0.80 | 0.37 | 225 | 166 |
| 22 | 58 | 0.15 | 5.70 | 0.82 | 0.36 | 256 | 167 |
| 23 | 56 | 0.15 | 7.40 | 0.85 | 0.36 | — | 97 |
| 24 | 70 | 0.75 | 4.50 | 0.52 | 0.67 | — | 214 |

The complex viscosity and Tan δ are plotted on a semi-log graph and shown as the attached FIGURE. The graph shows the broad range of crosslinked resins produced in this Example. The numbers beside the point on the graph correspond to the Run No. of this Example II.

EXAMPLE III

This Example is presented to compare commercially available crosslinked PVC resins which have a skin to the skinless crosslinked resins of this invention.

TABLE II

| Commercial Skin Type PVC Resin | Complex Visc. × $10^5$ Poise | Tan δ | Hg Porosity cc/g | Powder Mix Time - Sec. | Wt. Average Particle Size Micron |
|---|---|---|---|---|---|
| A | 44.50 | 0.70 | 0.349 | 448 | 119 |
| B | 31.50 | 0.62 | 0.366 | 556 | 123 |
| C | 14.80 | 0.59 | 0.204 | 477 | 123 |
| D | 5.75 | 0.62 | 0.239 | 829 | 109 |

As can be seen from the above data, the powder mix time is much longer for the crosslinked resins which have a skin than the powder mix times of the skinless crosslinked resins of this invention.

The above four competitive skin type crosslinked resins are shown on the FIGURE. The FIGURE is a semi-log graph of complex viscosity vs. Tan δ. The letters A-D beside the point indicate the corresponding resin of this Example III.

The resins of this invention have many uses where a matte finish is desired in a PVC product such as house siding and window cladding. The crosslinked resins of this invention may be used as 100% of the PVC required in a PVC formulation or they may be blended with non-crosslinked PVC resins in any proportions to achieve a desired result.

I claim:

1. An agitated aqueous suspension process for producing porous, substantially skinless, agglomerated, crosslinked polyvinyl chloride resin particles comprising polymerizing vinyl monomer together with at least one crosslinking agent in the presence of a dispersant system comprising (a) from about 0.02 to about 0.06 part by weight per 100 parts by weight monomer of an ion sensitive primary dispersant capable of thickening water; (b) from about 0.2 to about 0.4 part by weight of non-polyethylene oxide containing secondary dispersant; and (c) from about 0.1 to about 0.3 part by weight per 100 parts by weight vinyl monomer of a polyvinyl acetate secondary dispersant having a hydrolysis level less than 70%, said resin particles having a mercury porosity of from about 0.1 cc/g to about 0.8 cc/g, and a particle size of from about 70 microns to about 1000 microns, and a friability of less than about 2, and a powder mix time of less than about 400 seconds, and a shape factor less than about 0.85 and wherein greater than about 20% of the area of the surface of said particle is PVC as measured by ESCA.

2. A process of claim 1 wherein said non-polyethylene oxide containing dispersant is selected from the group consisting of sorbitan trioleate, sorbitan tristearate, sorbitan monooleate, sorbitan monopalmitate, glycerol monooleate, glycerol monostearate, and triglycerol monooleate.

3. A process of claim 2 wherein said primary dispersant is a lightly crosslinked interpolymer of acrylic acid.

4. A process of claim 3 wherein said polyvinyl acetate secondary dispersant has hydrolysis level less than 55%.

5. A process of claim 4 wherein said vinyl monomer is vinyl chloride.

6. A process of claim 1 wherein the level of said crosslinking agent is from about 0.05 part by weight to about 5.0 parts by weight per 100 parts by weight of vinyl monomer.

7. A process of claim 6 wherein said crosslinking agent is diallyl phthalate.

* * * * *